(12) United States Patent
Endou

(10) Patent No.: US 6,199,521 B1
(45) Date of Patent: Mar. 13, 2001

(54) FUEL DIRECT INJECTION TYPE TWO CYCLE INTERNAL COMBUSTION ENGINE

(75) Inventor: Tsuneaki Endou, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 0 days.

(21) Appl. No.: 09/366,067

(22) Filed: Aug. 2, 1999

(30) Foreign Application Priority Data

Aug. 7, 1998 (JP) .................................................. 10-223992

(51) Int. Cl.⁷ ..................................................... F02M 39/00
(52) U.S. Cl. ......................................... 123/73 R; 123/294
(58) Field of Search .................................. 123/294–305, 123/73 R

(56) References Cited

U.S. PATENT DOCUMENTS

| 3,892,207 | * | 7/1975 | Weise et al. | 123/148 E |
| 5,666,916 | * | 9/1997 | Fujieda et al. | 123/295 |
| 6,032,638 | * | 3/2000 | Kato | 123/295 |

FOREIGN PATENT DOCUMENTS

| 7-97925 | 4/1995 | (JP) . |
| 11-62748 | 3/1999 | (JP) . |

* cited by examiner

*Primary Examiner*—Marguerite McMahon
(74) *Attorney, Agent, or Firm*—Pearne & Gordon LLP

(57) ABSTRACT

A fuel direct injection type two cycle internal combustion engine including a high output pressure fuel pump having a pump drive shaft connected thereto and disposed in a vacant space in an engine body.

6 Claims, 3 Drawing Sheets

FUEL DIRECT INJECTION TYPE TWO CYCLE INTERNAL COMBUSTION ENGINE

TECHNICAL FIELD OF THE INVENTION

This invention pertains to a fuel direct injection type two cycle internal combustion engine and more particularly to an arrangement of a high output pressure fuel pump for supplying fuel to one of a plurality of fuel injection valves (fuel injectors) which in turn directly inject the fuel to a corresponding one of cylinders of the two cycle internal combustion engine.

BACKGROUND OF THE INVENTION

Of late, it has become a subject of discussion that more hydrocarbon is included in exhaust gas from a two cycle internal combustion engine and therefore the exhaust gas from the two cycle engine tends to be strongly regulated.

Accordingly, there has been desired a development of such arts as reduce an amount of hydrocarbon in the exhaust gas without damaging a feature of the two cycle internal combustion engine which can provide a high output therefrom in spite of its lightness and small size.

A fuel direct injection art in which fuel (generally gasoline) is directly injected into fuel chambers of respective cylinders is remarkably noted as one of them.

A main one of reasons for which the amount of hydrocarbon in the exhaust gas from the two cycle internal combustion engine is more than that from the four cycle internal combustion engine is that a part of mixed gas which is produced by being previously compressed in a crank case is blown out through exhaust ports when it sweeps combusted gas in the cylinders. This has been called "Blown Out Action".

It has been considered that the fuel is supplied to the cylinders by means of cylinder fuel direct injection in which the fuel is injected directly into the respective cylinders after all of scavenging ports and exhaust ports provided in cylinder walls are closed in place of the prior art in which the mixed gas produced by a carburetor and fuel injectors injecting the fuel into intake pipes, respectively, is supplied through the crank case to the respective cylinders. This fuel cylinder direct injection makes just air blown out through the exhaust ports when the combusted gas is swept, which enables the amount of hydrocarbon to be reduced in the exhaust gas.

In order to apply the cylinder fuel direct injection to the two cycle internal combustion engine, fuel injection valves (injectors) are required to be provided in cylinders, respectively, so as to inject the fuel directly to combustion chambers of the respective cylinders and the fuel should be supplied from a fuel pump to the respective fuel injection valves under pressure higher than an output pressure of the fuel injection pump. The amount of fuel to be injected into the respective cylinders will be expressed by a function of a difference pressure between a pressure of fuel applied to the fuel injection valves for the respective cylinders and a pressure in the respective cylinders when the fuel is to be injected and time (injection tine) for which the fuel injection valves are opened.

In order to make the cylinder fuel direct injection, the predetermined amount of fuel should be injected for extremely short period after both of the respective scavenging ports and exhaust ports are closed and before an ignition is made. Thus, there should be required higher fuel pressure applied from the fuel pump to the fuel injection valves as the injection time is shorter.

Since the output pressure of the fuel injection valve is extremely higher due to a compression stroke of the engine during the period for which the cylinder fuel direct injection is made (the period for which both of the scavenging ports and the exhaust ports are closed), there should be used a high output pressure rotary pump which provides a higher output pressure therefrom so as to inject the predetermined amount of fuel while overcoming the output pressure of the fuel injection valves.

The prior art two cycle internal combustion engine has a fuel pump not required to have an high output pressure although it has the fuel injection valves because the fuel is injected into the intake pipes or into the crank case. Thus, in the prior art, there has been a diaphragm type fuel pump which is driven by a pressure variation in the crank case or a rotary fuel pump which is driven by a battery driven motor. Both of the fuel pumps are not required to utilize the output of the engine for driving it.

Such a diaphragm type fuel pump as driven by a pressure variation in the crank case can hardly feed the fuel under the higher pressure overcoming the cylinder pressure at the compression stroke thereof. If such a rotary fuel pump as driven by a battery driven motor is utilized to feed the fuel under the higher pressure overcoming the output pressure of the cylinder pressure at the compression stroke thereof, then it is required to be disadvantageously large-sized because of the large-sized motor therefor. With the large-sized motor provided on the engine for driving the fuel pump, the engine is also large-sized. This will loss the advantage of the two cycle engine which can produce a higher output in spite of its small size.

It is considered that the fuel pump will be driven by a crank shaft of the engine while the higher output pressure overcoming the cylinder pressure at the compression stroke is generated. However, one end of the crank shaft of the engine is used for driving a main load while the other end is connected to a flywheel. Therefore, it is hard to drive the fuel pump by the crank shaft while generating such higher output pressure overcoming the cylinder pressure.

It is considered that the fuel pump to be driven while generating such higher output pressure will have a rotary drive shaft connected to a portion of the crank shaft end protruded from the flywheel. With such a crank shaft driven fuel pump used, the engine will be elongated in a longitudinal direction because the crank shaft of the engine will be longer and in addition the fuel pump is disposed in series with the flywheel. This causes the engine to be disadvantageously large-sized.

If the fuel pump is provided on the end of the crank shaft protruded from the flywheel, then a stator will be hardly provided on the side of the flywheel.

If the fuel pump generating such a higher output pressure overcoming the cylinder pressure is driven by the crank shaft, it is required to be resistant to the high revolution of the engine.

A conventional high output pressure fuel pump for a fuel direct injection type four cycle internal combustion engine has been mass produced. Such a mass production type high output pressure fuel pump can be hardly used for being mounted on the crank shaft of the two cycle internal combustion engine. In order to drive the fuel pump from the crank shaft of the two cycle engine, it is required to be designed and produced as a specific pump which can be resistant to the high revolution thereof. This causes the fuel pump to be expensively provided.

SUMMARY OF THE INVENTION

Accordingly, it is a principal object of the invention to provide a two cycle internal combustion engine adapted to drive a high output pressure fuel pump for supplying fuel to fuel injection valves which inject the fuel directly into cylinders without making the engine large-sized.

It is another object of the invention to provide a two cycle internal combustion engine adapted to supply fuel to fuel injection valves by being allowed to use such a mass production type high output pressure fuel pump as has been used for a four cycle internal combustion engine.

In accordance with a principle of the present invention, there is provided a two cycle internal combustion engine comprising an engine body including a crank case in which a crank shaft is disposed, 1st through Nth cylinders (N is an integral number of more than 2) disposed along an axial direction of the crank shaft, intake pipes to supply air to intake ports in said engine body and exhaust pipes connected to exhaust ports provided in the respective 1st through Nth cylinders, 1st through Nth fuel injection valves to inject fuel directly into combustion chambers of the respective 1st through Nth cylinders and a high output pressure fuel pump to supply the fuel to the 1st through Nth fuel injection valves, respectively, characterized by further comprising a pump drive shaft disposed in a vacant space in said engine body, supported by said engine body and connected to said high poutput pressure fuel pump and reduction gear means to transmit a revolution of the crank shaft to said pump drive shaft while reducing its revolution.

The pump drive shaft may be disposed in the vacant space between adjacent crank chambers corresponding to adjacent cylinders so as to cross the crank shaft. In this case, the reduction gear means may comprise a worm provided on the crank shaft and a worm wheel provided on the pump drive shaft and engaged with the worm.

In a crank chamber precompression type two cycle internal combustion engine which has separate crank chambers corresponding to the respective cylinders to be compressed so as to sweep the combusted gas, the crank chambers corresponding to the respective cylinders should have an air-tight construction and should have the same volume because it involves the amount of sweeping the combusted gas.

In the two cycle engine, a space between the adjacent ones of the cylinders and a space between the adjacent ones of the crank chambers tend to be larger than those of the four cycle engine because scavenging passages are required to be provided outside of the cylinders. Thus, it will be noted that the relatively larger vacant space is formed between the adjacent crank chambers in the straight type two cycle internal combustion engine in which the plurality of cylinders are arranged in series in the same direction. The large vacant space between the adjacent crank chambers makes the pump drive shaft to be easily disposed therein.

With the pump drive shaft disposed in the vacant space between the adjacent crank chambers so as to cross the crank shaft and connected to the high output pressure fuel pump, the high output pressure pump can be provided in the engine body without large-sizing the direct injection type two cycle internal combustion engine.

Alternatively, in a V type two cycle internal combustion engine, the pump drive shaft may be disposed so as to extend in parallel to the crank shaft. In this case, the pump drive shaft may be provided in the vacant space between the exhaust pipe and the crank case. The high output pressure fuel pump may be also provided in the vacant space between the exhaust pipe and the crank case.

Since the V type two cycle internal combustion engine has an arrangement of the adjacent crank chambers being par-tially overlapped so as to reduce a length of the engine in an axial direction, the space between the adjacent crank chambers has no room in which the pump drive shaft is disposed so as to cross the crank shaft.

With the pump drive shaft disposed so as to extend in parallel to the crank shaft of the V type two cycle internal combustion engine, the pump drive shaft can be provided without reducing the merit of the V type two cycle engine which is the reduction of the axial length.

With the high output pressure fuel pump provided in the vacant space between the exhaust pipe and the crank case, the high output pressure fuel pump can be arranged while the engine is prevented from being large-sized.

The high output pressure fuel pump used in the invention has a rotary drive shaft driven and serves to supply the fuel from its outlet under pressure higher than that in the combustion chambers at the compression stroke of the engine. The high output pressure fuel pump may be one used for the four cycle internal combustion engine by being provided on the cam shaft.

BRIEF DESCRIPTION OF THE DRAWING

The above and other objects and features of the invention will be apparent from the description of the embodiments of the invention taken along with reference to the accompanying drawings in which.

DETAILED DESCRIPTION OF EMBODIMENTS OF THE INVENTION

Figure 1:
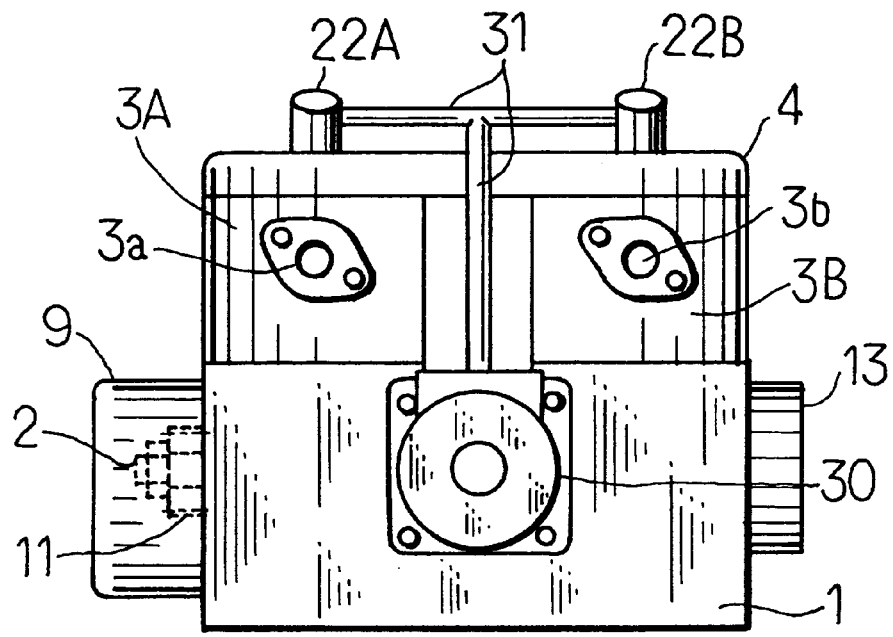
FIG. 1 is a side elevational view of a series type two cycle internal combustion engine constructed in accordance with one embodiment of the invention with an exhaust pipe removed therefrom.

Now referring to FIGS. 1 through 4, there is a straight type two cylinder two cycle internal combustion engine constructed in accordance with one embodiment of the invention. The two cycle internal combustion engine comprises an engine body including a crank case 1 in which a crank shaft 2 is disposed, first and second cylinders 3A and 3B, intake pipes 19A and 19B connected to intake ports in the crank case 1 as described in details later and an exhaust pipe 21 connected through diverging pipes 21A and 21B to exhaust ports 3a and 3b in the cylinders 3A and 3B, respectively. A common cylinder head 4 is provided on the first and second cylinders 3A and 3B.

In the crank case 1 are provided first and second crank chambers 1A and 1B corresponding to the first and second cylinders 3A and 3B, respectively. There is a vacant space between the first and second crank chambers 1A and 1B on the lower sides thereof. The vacant space may be utilized as a gear chamber (a chamber intermediate space) 1C in which a pump drive shaft is disposed as described in details later.

The crank shaft 2 is rotatably supported by bearings 5 and 6 provided in end walls on opposite sides of the crank case 1, respectively and by bearings 7 and 8 provided in a partition wall between the crank chamber 1A on the lower side thereof and the gear chamber 1C and in a partition wall between the crank chamber 1B on the lower side thereof and the gear chamber 1C.

A cover 9 may be provided on one end of the crank case 1 so that a gear box 10 is formed between the cover 9 and the crank case 1. A gear 11 is attached to an end of the crank shaft 2 extending in the gear box 10 which forms a part of reduction gear means as described in details later. The crank shaft 2 is connected through the reduction gear means to loads not shown.

A flywheel magnet rotor 12 is attached to the other end of the crank shaft 2 which extends out of the other side of the crank case 1 and a cover 13 may be provided on the crank case 1 so as to surround the magnet rotor 12.

Inside the cover 13 is supported a stator 14 which may be formed of a generator coil wound on an armature core so that a magnetic pole of the armature core of the stator 14 is faced to a magnetic pole of the magnet rotor 12 through a predetermined gap therebetween.

A magneto generator 15 is formed by the flywheel magnet rotor 12 and the stator 14. The magneto generator 15 is used for supplying an electric power to car electric devices such as an ignition device for the internal combustion, a lighting load, a battery and so on.

Within the first and second cylinders 3A and 3B are slidably engaged respective pistons 16A and 16B having respective piston rods 17A and 17B connected thereto. Within the crank chambers 18A and 18B are connected the piston rods 17A and 17B to the crank shaft 2.

Figure 2:
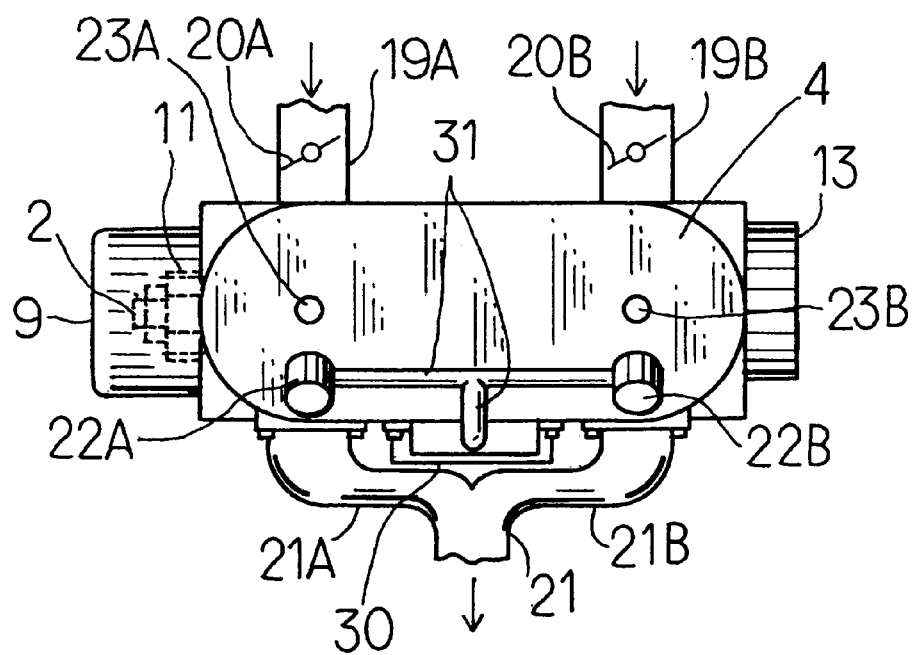
FIG. 2 is a plane view of the engine of FIG. 1 with the exhaust pipe mounted thereon.

In FIG. 2 are shown the intake pipes 19A and 19B connected through check valves such as reed valves not shown to intake ports also not shown which are in turn provided in the side of the crank case 1 so as to communicate with the crank chambers 1A and 1b, respectively. The air having the amount controlled by throttle valves 20A and 20B is supplied through the intake pipes 19A and 19B to the crank chambers 1A and 1B, respectively.

Scavenging ports not shown are provided in the first and second cylinders 3A and 3B, respectively and connected through scavenging passages to the crank chambers 1A and 1B, respectively.

The exhaust pipe 21 has branch pipe portions 21A and 21B connected to exhaust ports 3a and 3b provided in the first and second cylinders 3A and 3B, respectively.

In the cylinder head 4 are provided first and second fuel injection valves 22A and 22b to inject fuel directly into the combustion chambers in the first and second cylinders 3A and 3B, respectively and ignition plugs 23A and 23B to ignite the fuel in the combustion chambers in the first and second cylinders 3A and 3B, respectively.

Figure 3:
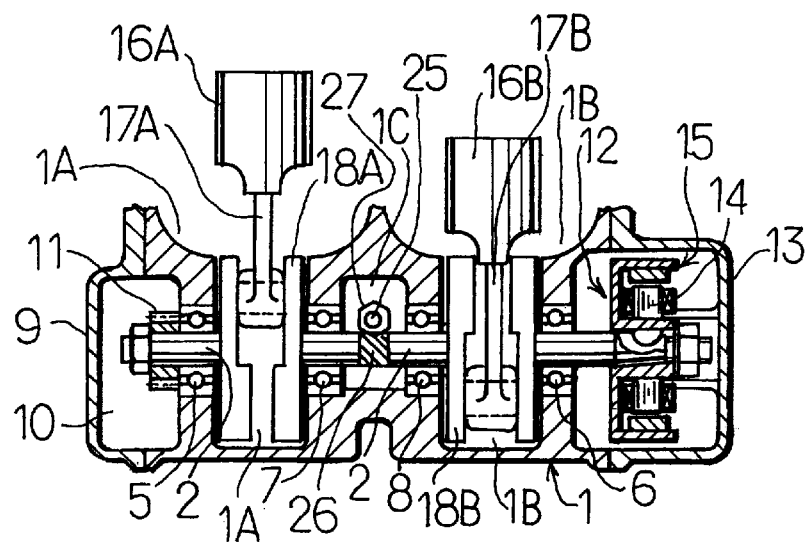
FIG. 3 is across sectional view of a crank case of the engine of FIGS. 1 and 2.
Figure 4:
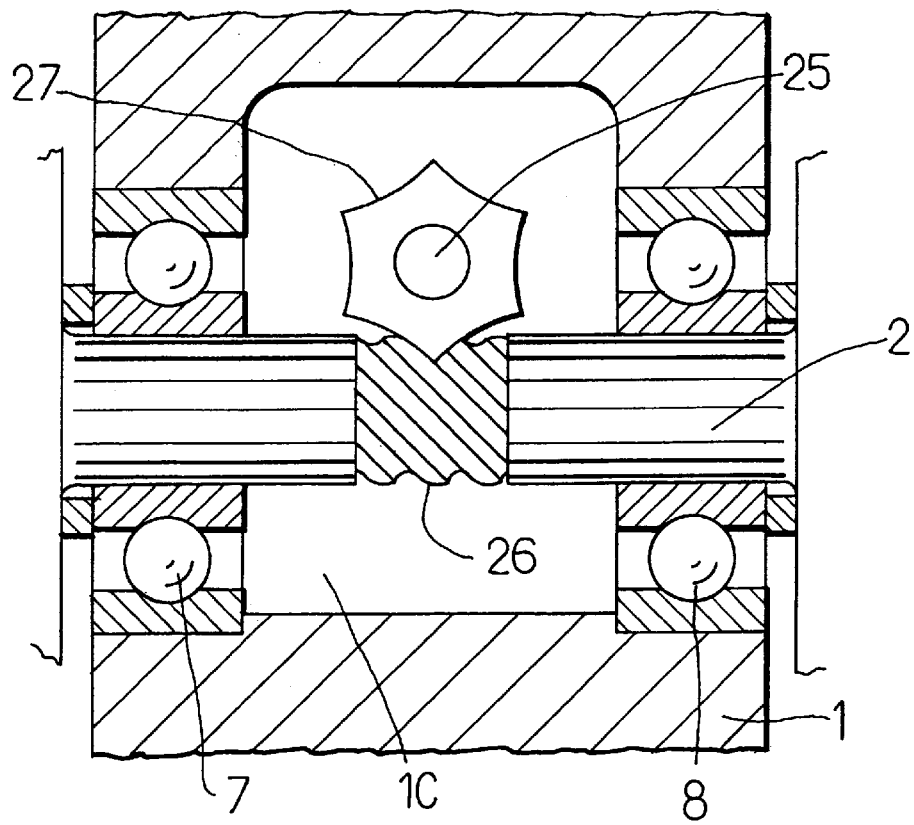
FIG. 4 is an enlarged cross sectional view of a vacant space between adjacent crank chambers in which a pump drive shaft and reduction gear mea re disposed.

As shown in FIGS. 3 and 4, a gear chamber 1C is formed between the crank chambers 1a and 1b of the crank case and is used as a vacant space in which a pump drive shaft 25 is disposed so as to cross the crank shaft 2. The pump drive shaft 25 may be supported in the crank case 2 by bearings not shown and connected to the crank shaft 2 through a reduction gear means which is also provided in the gear chamber 1C. Thus, it will be noted that as the crank shaft 2 rotates, the pump drive shaft 25 is rotatably driven at lower revolution.

In the illustrated embodiment, the reduction gear means comprises a worm 26 formed on that portion of the crank shaft 2 which is located within the gear chamber IC and a worm wheel 27 securely mounted on the pump drive shaft 25 and engaged with the worm 26 on the crank shaft 2.

The pump drive shaft 25 has a portion extended out of the side of the crank case 1 opposite to the side thereof where intake pipes 19A and 19B are provided. A high output pressure fuel pump 30 is securely mounted on the crank case 2 and connected to the extended portion of the pump drive shaft 25 at its end. An output port of the high output pressure fuel pump 30 is connected through a conduit 31 to fuel supply ports of the fuel injection valves 22A and 22B.

Thus, as the engine is driven, the rotation of the crank shaft 2 is transmitted through the pump drive shaft 25 to the high output pressure fuel pump 30, which serves to supply the fuel to the fuel injection valves 22A and 22B under a pressure higher than a pressure in the combustion chambers at their compression stroke.

The fuel injection valve 22A is opened to inject the fuel directly into the combustion chamber in the first cylinder 3A for the short period after both of the scavenging port and the exhaust port of the first cylinder 3A are closed and before it is ignited. Similarly, the fuel injection valve 22B is opened to inject the fuel directly into the combustion chamber in the second cylinder 3B for the short period after both of the scavenging port and the exhaust port of the first cylinder 3B are closed and before it is ignited.

In this manner, the pump drive shaft 25 can be provided by effectively utilizing the vacant space (the gear chamber 1C) in the engine body between the adjacent crank chambers 1A and 1B. Thus, it will be understood that the high output pressure fuel pump 30 can be provided without making it any large size in order to obtain a direct fuel injection system.

In the embodiment of FIGS. 1 through 4, the worm 26 on the crank shaft 2 may be formed by cutting when the crank shaft 2 is formed. Alternatively, a separate worm may be securely mounted on the crank shaft 2.

A two cycle internal combustion engine constructed in accordance with another embodiment of the invention is illustrated in FIGS. 5 through 8. The two cycle internal combustion engine of FIGS. 5 through 8 is illustrated to be of a V type engine.

Figure 5:
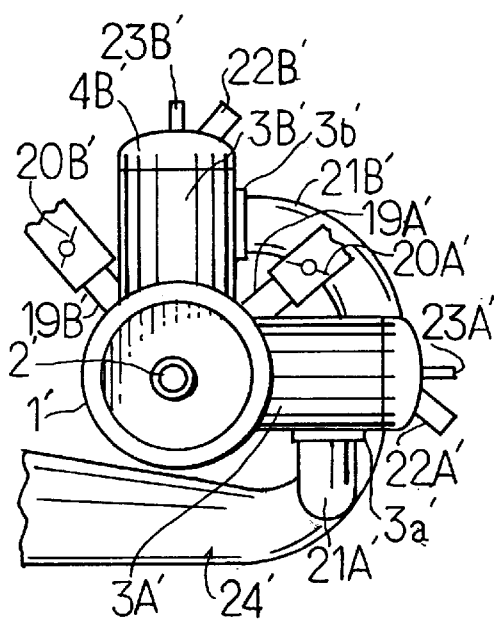
FIG. 5 is a front view of a V type two cycle internal combustion engine constructed in accordance with another embodiment of the invention.
Figure 6:
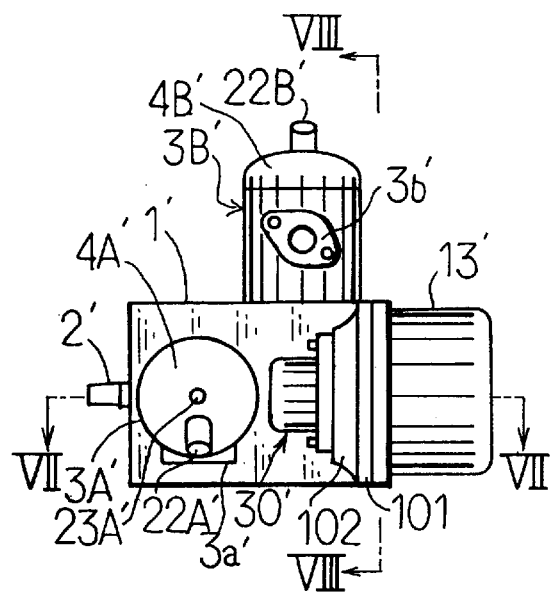
FIG. 6 is a plane view of the engine of FIG. 5 with the exhaust pipe removed therefrom.
Figure 8:
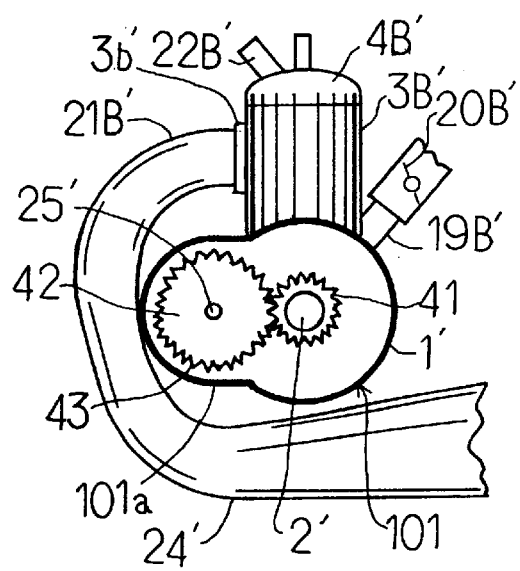
FIG. 8 is a cross sectional view of the engine of FIGS. 5 and 6 taken along a line of VIII—VIII of FIG. 6.

The V type engine also comprises an engine body including a crank case 1' in which a crank shaft 2' is disposed, first and second cylinders 3A' and 3B', intake pipes 19A' and 19B' connected to intake ports in the crank case 1' and exhaust pipes 21A' and 21B' connected to exhaust ports 3a' and 3b' in the cylinders 3A' and 3B', respectively. Cylinder heads 4A' and 4B' are provided on the first and second cylinders 3A' and 3B', respectively. The exhaust pipes 21A' and 21B' are connected to a muffler 24' as shown in FIGS. 5 and 8.

As shown in FIGS. 5 through 8, the V type two cycle internal combustion engine has the first and second cylinders 3A' and 3B' disposed at a space of 90 degree between each other and connected to the crank case 1'. The crank shaft 2' at one end thereof is extended out of the crank case 1' on one side thereof.

Since the V type internal combustion engine has no space in the crank case 1' in which a pump drive shaft 25' is allowed to be disposed, the pump drive shaft 25' is disposed in a vacant space of the engine body between the crank case 1' and the intake pipe 24' so that it extends in parallel to an axis of the crank shaft 2'. The pump drive shaft 25' is connected through a reduction gear means to the crank shaft 2'.

Figure 7:
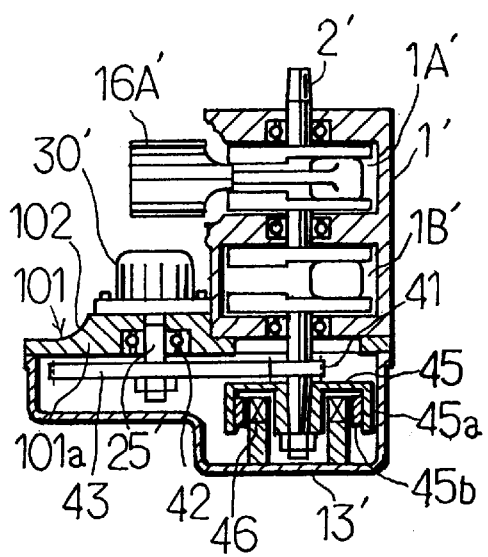
FIG. 7 is a cross sectional view of the engine of FIGS. 5 and 6 taken along a line of VII—VII of FIG. 6.

More particularly, as shown in FIG. 7, on the other side of the crank case 1' is provided an end plate 101 out of which the other end of the crank shaft 2' extends. As shown in FIG. 7, the end plate 101 has an extension 101a extending from the side of the crank case 1'. A frusto-conical body 102 is provided integrally with the extension of the end plate 101 on the side of the first cylinder 3A'.

The pump drive shaft 25' is rotatably supported on the frusto-conical body 102 by a bearing 42 so as to extend in parallel to the crank shaft 2'.

The reduction gear means comprises a pinion 41 securely mounted on the extended other end of the crank shaft 2' and a large gear 43 securely mounted on the pump drive shaft 25' and engaged with the pinion 41.

A high output pressure fuel pump 30' is securely mounted on the frusto-conical body 102 of the end plate 101 and connected to the pump drive shaft 25'. Thus, it will be noted that a rotation of the crank shaft 2' is transmitted through the reduction gear means to the high output pressure fuel pump 30' so as to drive it. It will be also noted that the position of the pump drive shaft 25' causes the high output pressure fuel pump 30' to be also disposed in the vacant space between the crank case 1' and the exhaust pipe 21B'.

The crank shaft 2' has a portion further extended from the pinion 41. A flywheel magnet rotor 45 of a magneto generator is securely mounted on the extended portion of the crank shaft 2'. The flywheel magnet rotor 45 may be of conventional type one which comprises a permanent magnet 45b securely mounted on an inner peripheral face of a cup type flywheel 45a.

A cover 13' may be provided on the end plate 101 so as to cover the flywheel magnet rotor 45, the pinion 41 and the large gear 43. The cover 13' may be secured to the end plate 101 by bolts not shown. A stator 46 of the magneto generator is securely provided on the cover 13'.

The stator 46 may be formed of an armature coil wound on an armature core having a magnetic pole so as to be faced to a magnetic pole of the rotary field which is in turn formed of the permanent magnet 45b of the rotor 45. The stator 46 may be positioned on a positioning portion of the cover 13' not shown so that the magnetic pole of the stator 46 is faced to the rotary field of the flywheel magnet rotor 45 with a gap kept between them.

Fuel injection valves 22A' and 22B' which inject fuel into combustion chambers in the first and second cylinders 3A' and 3B', respectively are provided on the cylinder heads 4A' and 4B', respectively. The fuel is supplied from the high output pressure fuel pump 30' to the fuel injection valves 22A' and 22B' through conduits not shown.

The intake pipes 19A' and 19B' are connected through check valves not shown to crank chambers 19A' and 19B' corresponding to the cylinders 3A' and 3B', respectively. Throttle valves 20A' and 20B' serve to control an amount of air flowing through the intake pipes 19A' and 19B' to the cylinders 3A' and 3B', respectively.

Ignition plugs 13A' and 13B' are provided on the cylinder heads 4A' and 4B' of the first and second cylinders 3A' and 3B' which serve to ignite the first and second cylinders 3A' and 3B', respectively.

The high output pressure fuel pump 30 and 30' used in the two cycle internal combustion engines of the first and second embodiments of the invention may be of a mass production type fuel pump used for a fuel direct injection type four cycle internal combustion engine.

A high pressure output fuel pump used for a fuel direct injection type four cycle internal combustion engine has a drive shaft connected to a cam shaft which is in turn connected to a crank shaft so that a rotation thereof is transmitted at a reduction rate of ½ from the crank shaft, which causes the high output pressure fuel pump is driven at a reduction rate of ½ of the revolution of the crank shaft. Since the maximum revolution of the four cycle internal combustion engine is 7000 r.p.m., the high output pressure fuel pump for the four cycle engine is designed to be resistant to the revolution of 3500 r.p.m.

On the other hand, the two cycle internal combustion engine is designed to be of high revolution and high pressure type and the maximum revolution thereof reaches more than 10000 r.p.m. Thus, if the high output pressure fuel pump for the four cycle engine is used for supplying the fuel to the fuel injection valves of the two cycle engine while being driven at a reduction rate of ½ of the revolution of the crank shaft in the same manner as used for the four cycle engine, then the maximum revolution of the high pressure output fuel pump exceeds the allowable revolution thereof, which causes the fuel pump to be broken.

Thus, it will be noted that the high pressure output fuel pump for the four cycle engine may be used for the two cycle engine as they are while the reduction gear means for transmitting a rotation of the crank shaft to the pump drive shaft is so set to have a reduction rate of less than ½, that is less than 3500/10000 in the aforementioned example.

With the pump drive shaft disposed so as to cross the crank shaft or so as to extend in parallel to the crank shaft and connected through the reduction gear means to the crank shaft as aforementioned embodiments, the pump drive shaft can be provided within the vacant space of the engine body. This allows the high output pressure fuel pump for the fuel direct injection type two cycle engine to be mounted on the two cycle engine without making the engine large sized.

With the fuel pump driven at a reduced revolution of the crank shaft, the conventional mass-production type high output pressure fuel pump for the four internal combustion engine can be economically used for the fuel direct injection type two cycle internal combustion engine.

Although, in the illustrated embodiments, the intake pipes are illustrated to be connected to the intake ports in the crank cases, they may be connected to those provided in the cylinders.

Although some preferred embodiments have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A fuel direct injection type two cycle internal combustion engine comprising an engine body including a crank case in which a crank shaft is disposed, 1st through Nth cylinders (N is an integral number of more than 2) disposed along an axial direction of said crank shaft, intake pipes to supply air to intake ports in said engine body and exhaust pipes connected to exhaust ports provided in the respective 1st through Nth cylinders, 1st through Nth fuel injection valves to inject fuel directly into combustion chambers of the respective 1st through Nth cylinders and a high output pressure fuel pump to supply said fuel to said 1st through Nth fuel injection valves, characterized by further comprising a pump drive shaft disposed in a vacant space in said engine body, supported by said engine body and connected to said fuel pump and a reduction gear means to transmit a rotation of said crank shaft to said pump drive shaft while reducing its revolution.

2. A fuel direct injection type two cycle internal combustion engine as set forth in claim 1, and said 1st through Nth cylinders having crank chambers separately provided from each other, said vacant space of said engine body being a chamber intermediate space formed between the adjacent two crank chambers corresponding to the adjacent two cylinders, respectively, and said pump drive shaft being disposed in said chamber intermediate space so as to cross said crank shaft and rotatably supported in said crank case.

3. A fuel direct injection type two cycle internal combustion engine as set forth in claim 2, and wherein said reduction gear means comprises a worm provided on said crank shaft and a worm wheel provided on said pump drive shaft and engaged with said worm.

4. A fuel direct injection type two cycle internal combustion engine as set forth in claim 1, and said pump drive shaft being supported on said crank case so as to extend in parallel to an axis of said crank shaft.

5. A fuel direct injection type two cycle internal combustion engine as set forth in claim 4, and said pump drive shaft being disposed in the vacant space between said exhaust pipe connected to one of said 1st through Nth cylinders and said crank case.

6. A fuel direct injection type two cycle internal combustion engine as set forth in claim 5, and wherein said high output pressure pump being disposed in the vacant space between said exhaust pipe connected to one of said 1st through Nth cylinders and said crank case.

* * * * *

UNITED STATES PATENT AND TRADEMARK OFFICE
CERTIFICATE OF CORRECTION

Page 1 of 1

PATENT NO. : 6,199,521 B1
DATED : March 13, 2001
INVENTOR(S) : Tsuneaki Endou

It is certified that error appears in the above-identified patent and that said Letters Patent is hereby corrected as shown below:

<u>Title page,</u>
Item [75] the inventor's information, delete "Numazu" and insert -- Shizuoka-ken --.

<u>Column 1,</u>
Line 60, delete "tine" and insert -- time --.

<u>Column 3,</u>
Line 24, delete "poutput" and insert -- out put --.

<u>Column 4,</u>
Line 34, delete "across" and insert -- a cross --.
Line 38, delete "mea re" and insert -- means are --.

<u>Column 6,</u>
Line 6, delete "IC" and insert -- 1c --.

Signed and Sealed this

Nineteenth Day of March, 2002

Attest:

Attesting Officer

JAMES E. ROGAN
*Director of the United States Patent and Trademark Office*